July 21, 1925.
C. V. STUART
NONSKID OR MUD SHOE
Filed March 31, 1923     2 Sheets-Sheet 1
1,547,078
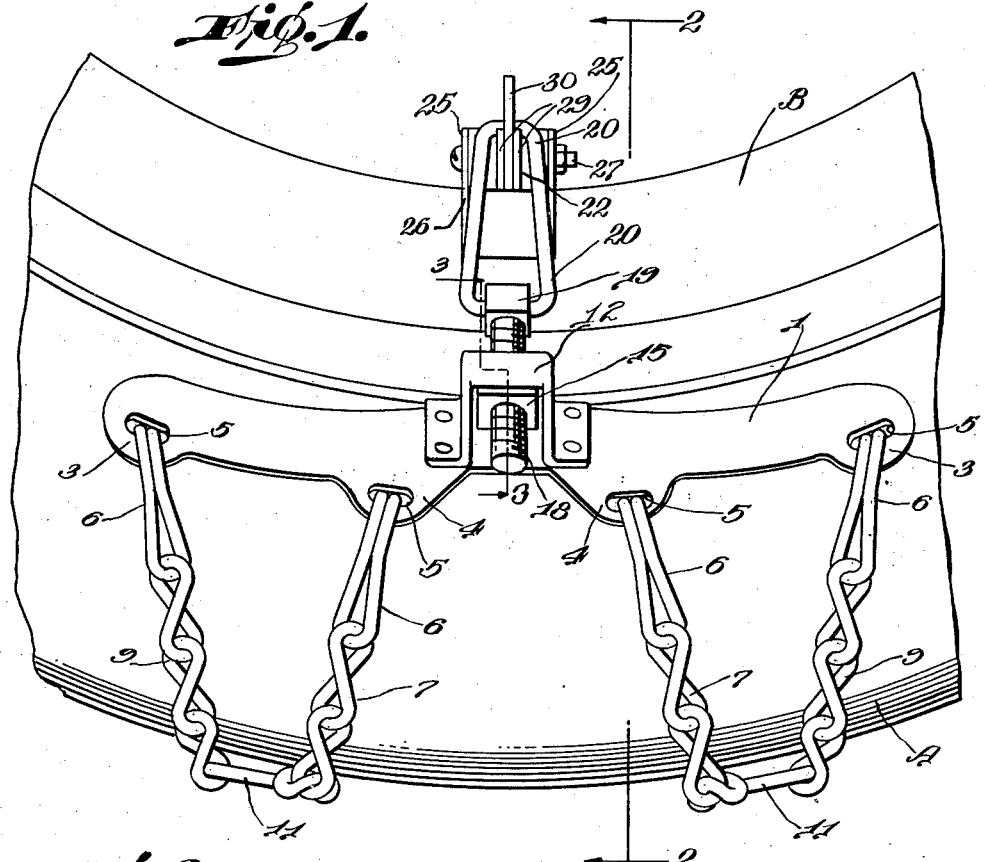
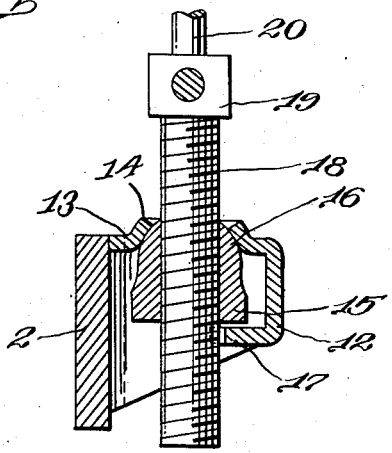 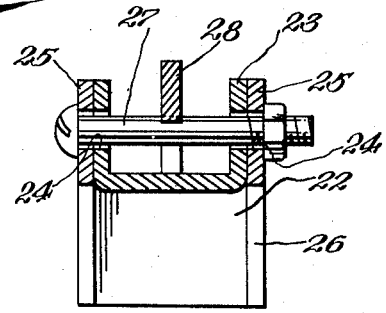
C. V. Stuart
INVENTOR
BY Victor J. Evans
ATTORNEY July 21, 1925.
C. V. STUART
NONSKID OR MUD SHOE
Filed March 31, 1923 2 Sheets-Sheet 2
1,547,078
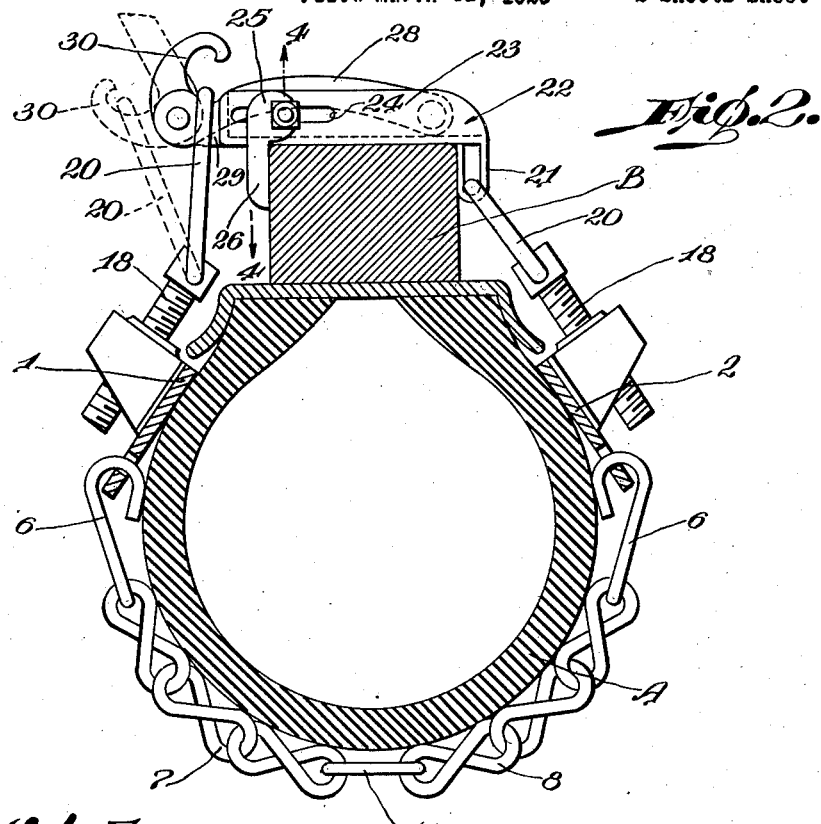
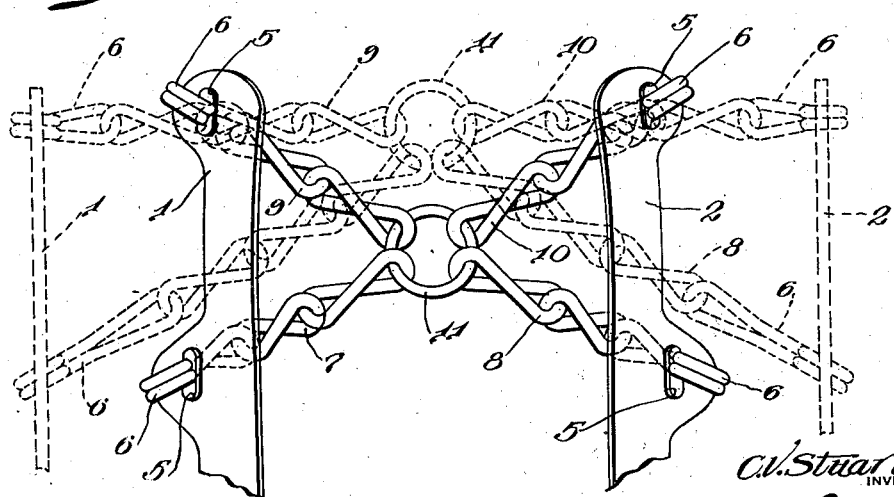

Patented July 21, 1925.

1,547,078

UNITED STATES PATENT OFFICE.

CHARLES V. STUART, OF KANSAS CITY, MISSOURI, ASSIGNOR TO NATIONAL NON-SKID COMPANY, OF KANSAS CITY, MISSOURI.

NONSKID OR MUD SHOE.

Application filed March 31, 1923. Serial No. 629,115.

*To all whom it may concern:*

Be it known that I, CHARLES V. STUART, a citizen of the United States, residing at Kansas City, in the county of Jackson and State of Missouri, have invented new and useful Improvements in Nonskid or Mud Shoes, of which the following is a specification.

This invention relates to non-skid or mud shoes particularly designed for use in connection with motor vehicles, and an object of the invention is to provide a shoe structure which may be quickly and easily attached to a wheel structure about the tire to provide a cross chain structure to prevent slipping or skidding of a vehicle equipped with the device, and also to facilitate the travel of the vehicle through muddy places.

A further object of the invention is to provide a non-skid device for use on motor vehicle tires which is designed to eliminate rolling of the chains of the device over the tire during the travel of the vehicle, which will also materially eliminate rupturing or mutilation of the tire as well as reduce to a minimum wear on the tire casing such as is ordinarily occasioned by non-skid devices.

Another object of this invention is to provide a non-skid shoe as specified which is designed so that it may be attached to and will properly fit tires of different sizes, thereby permitting the manufacture of shoes which will fit practically any of the commonly used tires.

More specifically, the invention comprehends the provision of a non-skid or mud shoe as specified, which comprises a pair of side plates adapted to snugly hug the sides of the casing of a pneumatic tire, which side plates have a felly clamp adjustably and swivelly connected thereto to facilitate the attachment of the shoes to a tire, and also to provide a plurality of cross chains which are connected to and connect the side plates, the said cross chains having their inner ends connected loosely to a ring to permit them to assume various angles relative to the side plates to allow them to conform to tires of different cross sectional diameters.

Other objects of the invention will appear in the following detailed description taken in connection with the accompanying drawings wherein:—

Fig. 1 is a side elevation of the improved non-skid or mud shoe showing it applied.

Fig. 2 is a section through the improved non-skid or mud shoe taken on the line 2—2 of Fig. 1.

Fig. 3 is a detail section taken on the line 3—3 of Fig. 1.

Fig. 4 is a detail cross section taken on the line 4—4 of Fig. 2.

Fig. 5 is a fragmentary plan illustrating the cross chains and their manner of connection.

Referring more particularly to the drawings, the improved non-skid or mud shoe comprises a pair of side plates 1 and 2 which are constructed of flat metal and are curved longitudinally on a radius substantially equivalent to the radius of the wheel or wheels on which they are to be used. The plates 1 and 2 are similar in construction and are provided with bosses 3 at each end and a pair of bosses 4 intermediate their ends which project laterally. The bosses 3 and 4 are provided with openings or slots 5 which are arranged on an arc scribed by a radius substantially equal to the radius of the wheel on which the shoe is to be used. The slots or openings 5 receive therethrough hooks 6 which are connected to the ends of the cross chains 7, 8, 9 and 10 to permit detachable connection of the cross chains to the side plates. The cross chains 7, 8, 9 and 10 are connected at their inner ends by a ring 11 in such manner as to permit movement of the chains relative to the ring and relative to each other so as to allow the outermost chains or the chains 9 and 10 to extend substantially straight across a tire, as shown in dotted lines in Fig. 5 of the drawings when the tire is of a relatively large size at which time the chains 9 and 10 are positioned so as to increase the degrees of the angles at which they extend relative to the side plates 1 and 2 to permit the shoe to adapt itself to the size of tire on which it is used. When, it is used on a relatively small tire the chains assume the diagonal relations, as shown in solid lines in Fig. 5 of the drawings, permitting tight and snug fitting of the chains, side plates and hooks against the outer surface of the tire.

The plates 1 and 2 have bracket boxes 12 riveted to their outer sides, the inner surfaces or sides 13 of which are perforated and have bosses 14 formed about the openings as clearly shown in Fig. 3 of the drawings. Nuts 15 which have their inner surfaces rounded as shown at 16 are mounted within the bracket boxes 12 and are confined therein by means of the inturned outer sides 17 of the bracket boxes. The nuts 15 are threaded upon bolts 18, which bolts have heads 19 upon their inner ends to which rings 20 are connected. The ring 20 which is connected to the bolt 18 carried by the plate 2 is connected by means of a loop 21 to a felly engaging clamp body 22. The sides 23 of the clamp body 22 are provided with longitudinally extending slots 24. The ears 25 formed on the ends of the felly engaging plates 26 are connected by means of a bolt 27 to the sides 23. The bolt 27 extends through the slots 24 so as to permit adjustment of the felly engaging plate 26 along the body 22 and relative to the loop 21 so that the plate 26 may be adjusted to cause tight fitting engagement of the plate and the loop 21 against the sides of a wheel felly as shown at B. A lever 28 is pivotally connected to an extension 29 on the body 22 and it has a transversely extended hook 30 formed thereon which is adapted to engage the ring 20 carried by the bolt 18 which is in turn carried by the plate 1 for clamping the shoe tightly about the tire A when the lever 28 is moved downwardly between the sides of the body 22, as shown in solid lines in Fig. 2 of the drawings.

The rounded portions of the nuts 16 will permit oscillatory movement of the bolts 18 relative to the plate 1 and will provide a flexible articulated connection between the plates 1 and 2 and the clamp body 22 permitting the adapting of the shoe structure to different sized tires, which adaption is further augmented by the longitudinal adjustment of the bolts 18 relative to the plates 1 and 2 permitted by the threading of the bolts through the nuts 15.

It is, of course, to be understood that the invention may be constructed in other manners and the parts associated in different relations and, therefore, I do not desire to be limited in any manner except as set forth in the claims hereunto appended.

Having thus described my invention what I claim is:—

1. A non-skid device comprising side plates, a plurality of cross chains connected to said side plates and adapted to extend transversely across the tire, a clamp structure for clamping engagement with the wheel felly, bolts connected to said clamp structure, bracket boxes carried by said plates, nuts within said bracket boxes and provided with rounded surfaces engaging the bracket boxes to permit swivel movement of the nuts relative to the side plates, said bolts threaded through said nuts.

2. A non-skid device comprising side plates, a plurality of cross chains connected to said side plates and adapted to extend transversely across a tire, clamps adapted for clamping engagement with a wheel felly, nuts carried by said side plates for swivel movement relative to the side plates, bolts adjustably carried by said nuts, and rings connecting said bolts and clamps.

In testimony whereof I affix my signature.

CHARLES V. STUART.